Feb. 10, 1970     E. K. SUTTON     3,494,182

SOIL SHEARING MACHINE

Filed Jan. 29, 1968

INVENTOR

EARL K. SUTTON

BY *William G. Gapcynski*

ATTORNEY

United States Patent Office 3,494,182
Patented Feb. 10, 1970

3,494,182
SOIL SHEARING MACHINE
Earl K. Sutton, Kansas City, Mo., assignor to the United
States of America as represented by the Secretary of
the Army
Filed Jan. 29, 1968, Ser. No. 701,336
Int. Cl. G01n *3/24, 3/00*
U.S. Cl. 73—101        4 Claims

ABSTRACT OF THE DISCLOSURE

This invention relates to a device for direct shear testing of earthen samples. The device of this invention is designed to measure a reversible shear in samples such as shales, which are of a less pliable nature and fracture along an irregular face. The device includes a vertically loaded test sample which may be subjected to a measured horizontal shearing force, rotated 180 degrees, and subjected to the same force in the opposite direction.

---

The invention described herein may be manufactured and used by or for the Government for government purposes without the payment to me of any royalty thereon.

BACKGROUND OF THE INVENTION

Field of the invention

The device of this invention incorporates a rotatable sample testing cell for reversible application of shear to an earthen test sample.

Description of the prior art

In the design of foundations where high unit loading is expected, it is necessary to utilize certain values pertaining to the stability of the underlying materials. To obtain accurate values it is necessary to test samples of said materials under conditions simulating, as closely as possible, natural conditions.

It is a common practice to perform a direct shear test to obtain values readily usable in the study of foundation problems. The usual direct shear test is performed on earthen materials in which the particles of the sample are loosely bound to each other. With such a sample the plane of shear can be predetermined and the sample forced to fail along this plane. However, when the earthen sample is a material of a harder nature, such as shale, the direct shear test creates problems. Shales, being of a much less pliable nature than soils, are more likely to produce, when sheared, an iregular, fractured surface as compared to the plane surface of soils.

The nature of the shear plane as developed in soils is such that additional movement of the sheared faces past one another will produce a uniform amount of frictional resistance. Therefore, to slide the faces back and forth past one another would not produce an appreciable change of frictional resistance.

But when shale is sheared, even though the production of a sheared face will be the result of a fracture generally along a bedding plane, it would be contrary to the nature of the failure to force the production of a shear plane in a predetermined position. The fractured face is generally quite irregular, and the surfaces thereof are rough and uneven. This rough and uneven surface will produce a large amount of frictional resistance when the two faces are forced to slide one over the other, and as these faces are rubbed back and forth the roughness is worn away and the surfaces approach a plane and lubricated condition with a large change in frictional resistance.

In the foundation design of earthfilled dams one necessary item to be considered is the change which takes place in the existing shale foundation materials during small slides in the earthfill. These slides are produced by small earthquakes caused by caverns collapsing when the valley floor is loaded with the superimposed lake as a result of the damming of a stream. The nature of shocklike forces tends to produce movement of a vibratory or back and forth nature as contrasted with a movement in a continuous direction. The movement forces shale fractures to rub back and forth. The important parameter to be evaluated is the value of the change in frictional resistance produced by vibratory conditions after shale has been subjected to stresses great enough to produce a fracture.

To simulate the above conditions it is necessary to devise a shearing apparatus which would contain a specimen and through an increasing stress application cause the shale to shear. However, unlike the prior art soil shearing devices of, for example, H. M. O'Neil, U.S. Patent Number 3,127,765, added movement, after shear has taken place in a shale specimen, is of extreme importance to obtain meaningful results.

SUMMARY

As contrasted to soil shearing devices this invention for shearing a shale specimen is designed through the use of a rotatable specimen cell and releasable coupling to permit shearing and reshearing in reversible directions while the confining vertical load remains continuously applied. This holds the sheared faces in uniform contact throughout repeated shearing tests with a single force train.

Accordingly, it is an object of this invention to provide a reversible shear testing machine.

It is another object to provide a shear test cell mounted on a rotatable base for shear testing a sample in alternate directions.

It is a further object to provide a shear testing device having a single force train and a rotatable cell for shearing a sample under a constant vertical load in alternate lateral directions.

It is still another object to provide a device for duplicating vibratory shearing effects to evaluate the frictional resistance of a shale sample.

BRIEF DESCRIPTION OF THE DRAWINGS

These and other objects will become readily apparent with reference to the description and following drawings wherein.

DESCRIPTION OF THE PREFERRED EMBODIMENT

Figure 1:
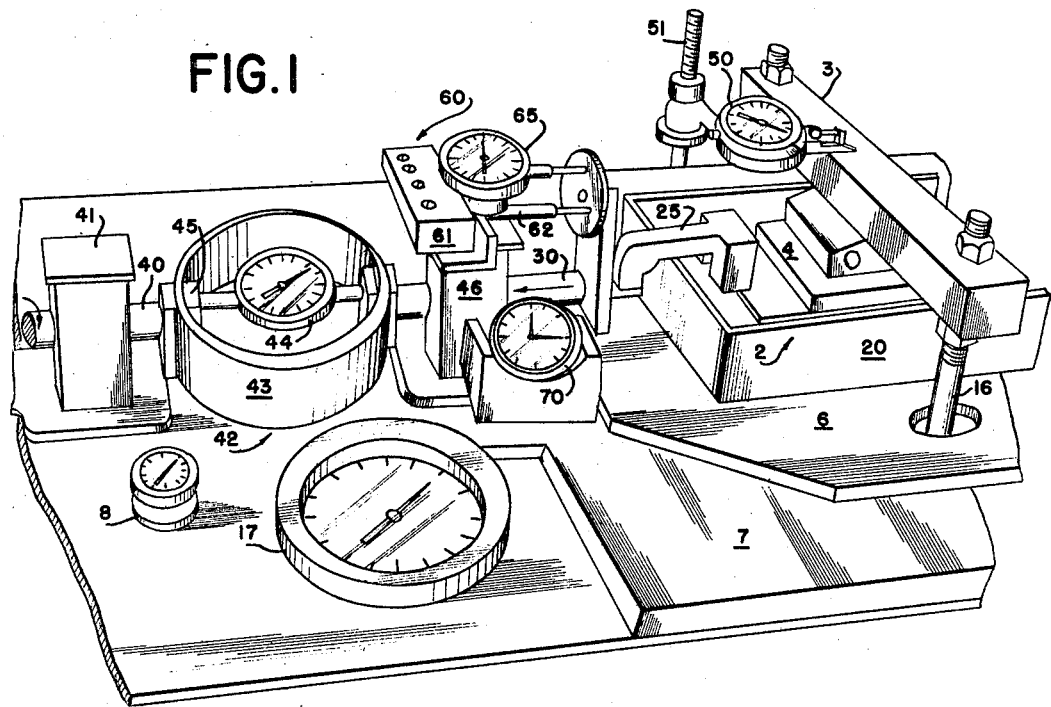
FIG. 1 is a perspective of the shear testing device of this invention.
Figure 2:
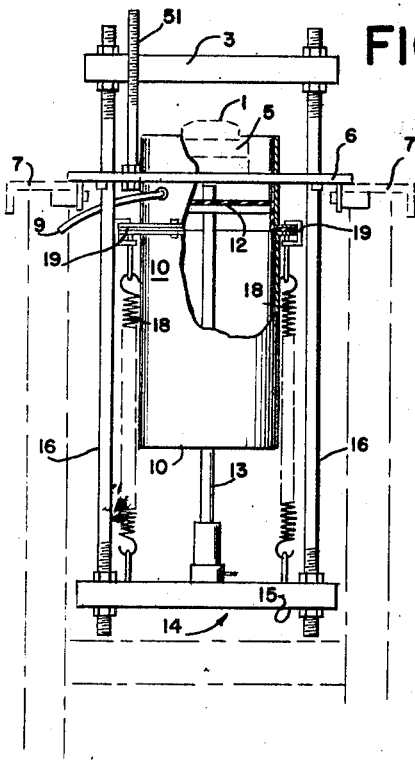
FIG. 2 is a partial sectional view of the rotatable test cell.

To utilize the device of this invention an earthen specimen 1 is cut to size and placed in the shear box container 2, and the vertical loading pressure bar 3 is centered over the upper bearing block 4, the specimen being disposed between the upper block 4, and the lower block 5.

Lower block 5 is rigidly secured to the upper surface of rotatable platform 6. Platform 6 is rotatably mounted on table 7.

With the adjustment of air pressure regulator 8, air pressure from hose 9 is permitted to enter air chamber 10, above diaphragm sealed piston 12. This pressure drives piston 12 downwardly. Chamber 10 should be rigidly secured to the lower surface of platform 6 and centered below block 5. The chamber should be designed to permit about six inches downward travel of diaphragm 12, to insure accurate positioning of the specimen 1. The amount of air pressure required is predetermined depending upon the unit load to be applied to the specimen. The pressure is indicated by a conventional precision air gauge 17. The downward pressure of diaphragm 12 is imparted through rod 13 to yoke 14, which exerts a downward force on the vertical loading pressure bar 3. Yoke 14 consists of a base 15, supporting the lower end of rod 13, a pair of vertical yoke rods 16 for transmitting the downward force of the rod 13 to the bar 3. Return springs 18 connect yoke base 15 to an external lip 19, on air chamber 10, which also mounts the periphery of diaphragm 12.

Rotatable platform 6 then supports the air chamber 10, yoke 14, and pressure bar 3, together with the lower bearing block 5, which holds a specimen 1.

The shear box container includes the upper block 4, lower block 5, and a water jacket 20, to hold water for reconsolidation of the specimen. Jacket 20 may also be mounted on platform 6.

After a specimen is placed between blocks 4 and 5, for testing and the vertical load desired is applied, water is added to the jacket 20, until the specimen is immersed. In order to institute stable conditions a direct shear test normally requires that the specimen be allowed to consolidate under vertical loading while soaking, thereby simulating natural conditions.

Figure 3:
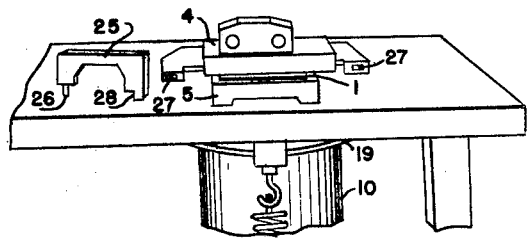
FIG. 3 shows the shearing plates and connecting hook of the test cell.

After consolidation is complete, a force train is attached to the upper block 4. This is done by engaging a U-shaped hook 25, between the pull bar 30 and block 4. A pin 26 may be used to connect the hook 25 with bar 30, while block 4 has a lip 27 at either end to engage an adjacent leg 28 of hook 25, as shown in FIG. 3.

The force train consists of a conventional motor, not shown, which drives shaft 40. It will be obvious to one of ordinary skill that the speed of the motor must be adjusted using conventional gears to that rotation desired. To insure horizontal alignment, shaft 40 may pass through ball bushing guide 41. Proving ring assembly 42 utilizes a ring 43 and deflection gauge 44, together with a conventional traveling rotation-to-translation coupling 45, to translate the rotation of shaft 40 to horizontal pull exerted on the ring 43. This horizontal force is transmitted by ring 43, from shaft 40, to bar 30, and through hook 25, to exert a horizontal pull on the vertically loaded upper block 4. The alignment of bar 30 may be insured by a second ball bushing guide 46 disposed on said rod between ring 43 and hook 25.

A conventional gauge 50 should be mounted on platform 6, by a support post 51, to measure the vertical movement of vertical loading bar 3 during a shear test.

A conventional limit switch 60 may be utilized in circuit with the force train drive motor to stop the motor when the horizontal displacement of bar 30 and upper block 4 reaches a preselected limit. The switch utilizes an immovable contact 61 fixed on table 7, and a telescoping, movable contact 62 attached to bar 30. The bar is designed to displace horizontally until the contacts meet at which point the motor shuts off stopping the shearing.

Therefore, to perform a direct shear test the vertical motion is indicated by gauge 50; the vertical load by gauge 17; the horizontal load by the deflection gauge 44; the horizontal displacement of block 4 by gauge 65; and the time elapsed by clock 70.

At the completion of a predetermined horizontal travel the limit switch 60 may be used to stop the test. At this point hook 25 is disconnected from bar 30 and block 4. Platform 6 is then rotated 180 degrees, and shaft 40 rotated in the opposite direction until bar 30 moves horizontally to return to its starting position. Hook 25 is then reengaged with bar 30 and block 4, and the test is repeated shearing the specimen in the reverse direction.

To obtain the results desired this test may be repeated for several days. The gauge readings may be recorded manually, or a motion picture camera may be used to photograph the cluster of gauges shown in FIG. 1, at preselected intervals of time.

It will be obvious to one of ordinary skill in the art that the driving motor and gear train are of conventional design and that the method of measuring system variables may be varied within the scope of this invention.

I claim:
1. In a device for measuring the frictional resistance in direct shear of an earthen specimen including an upper and a lower block for holding the specimen, means connected to said upper block for vertically loading the specimen, and means releasably connected to the upper block for exerting a horizontal shear force on the specimen, the improvement comprising rotatable base means connected to said lower block and supporting said blocks, specimen and vertical loading means for reversing the shear force horizontally applied to said specimen, so that said specimen is subjected sequentially to direct shear in alternate horizontal directions.

2. The device of claim 1 wherein said rotatable base means further comprises a horizontally rotatable support said support laterally confining said lower block on an upper surface thereof; said base carrying attached to a lower surface thereof a pressure driven cylinder and piston linkage means connecting said piston with said upper block so that when a specimen is confined between said upper and lower blocks and pressure is admitted into said cylinder said pressure drives said piston to exert a vertical load on said upper block.

3. The method of measuring the frictional resistance of an earthen specimen to vibratory shearing forces comprising the steps of:
    (a) exerting a preselected vertical force on said specimen;
    (b) saturating said specimen with water;
    (c) shearing said specimen in a first lateral direction;
    (d) measuring the force necessary to shear said sample in said first lateral direction;
    (e) shearing said specimen in a second lateral direction, said second direction being 180 degrees disposed to said first direction; and
    (f) measuring the force necessary to shear said specimen in said second lateral direction;

4. The method of claim 3 further comprising the steps of:
    (a) confining said specimen in a rotatable, force transmitting test cell while said specimen is subjected to said vertical force, saturated, sheared in the first lateral direction, and said shear force is measured;
    (b) rotating said test cell 180 degrees;
    (c) subjecting said test cell to a second force in said first lateral direction until said specimen is sheared in said second lateral direction; and
    (d) measuring said second force.

References Cited

UNITED STATES PATENTS 2,656,718  10/1953  Dames et al. _____ 73—101 X
3,127,765  4/1964   O'Neil _____ 73—101 X JERRY W. MYRACLE, Primary Examiner U.S. Cl. X.R.

73—84